United States Patent Office 2,725,006
Patented Nov. 29, 1955

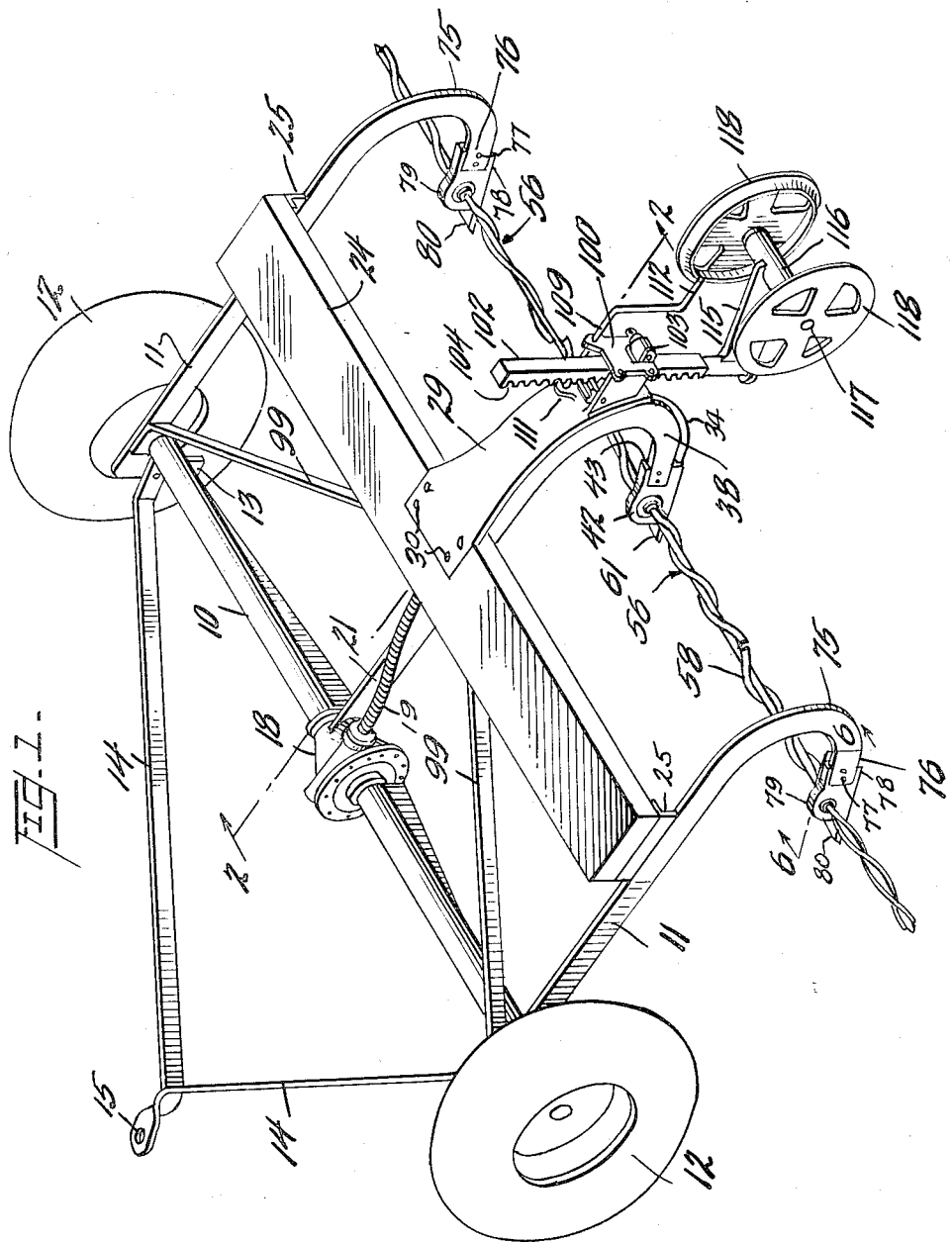

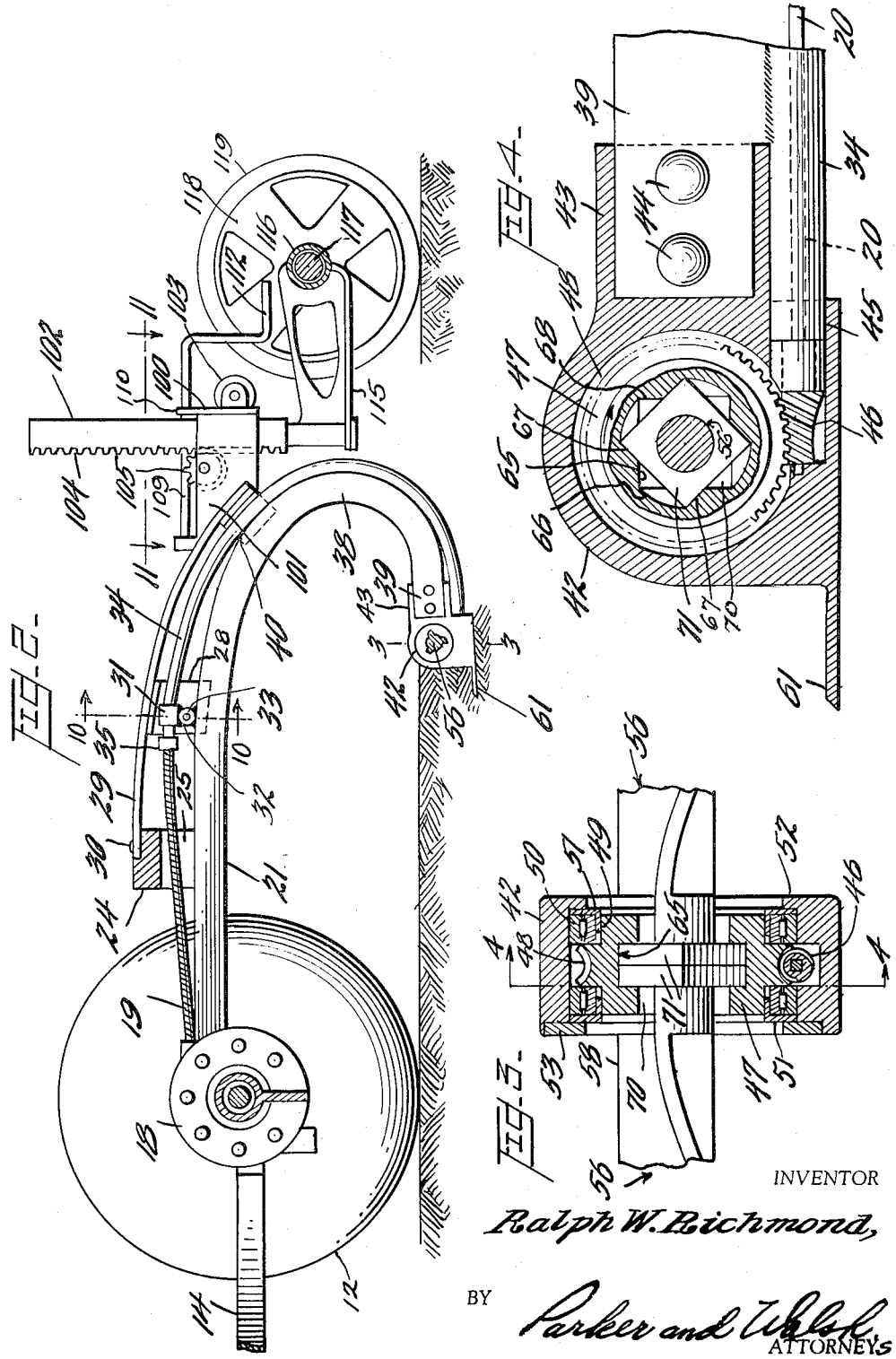

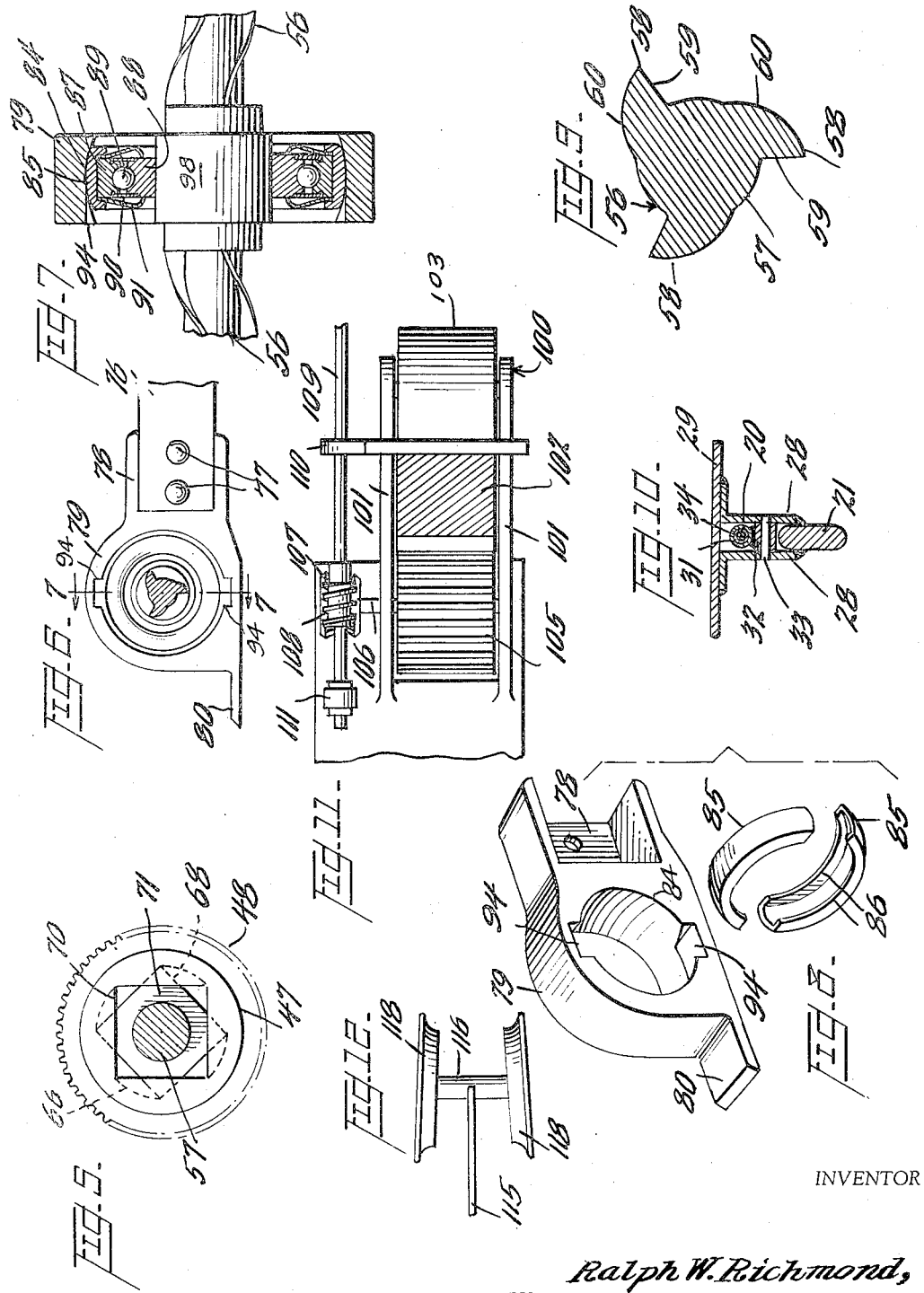

2,725,006

ROD WEEDER

Ralph W. Richmond, Hermiston, Oreg.

Application April 20, 1951, Serial No. 222,085

7 Claims. (Cl. 97—42)

This invention relates to rod weeders, namely to that type of farm implement which provides a rotatable rod movable transversely thereof just beneath the surface of the ground to uproot and bring to the surface all weeds encountered by the rod so that the weeds dry or decay and thus die.

In an apparatus of this general type previously in use, it has been the common practice to drive the rod from one end thereof, thus providing a very substantial rod length subject to relatively high destructive flexing forces operating laterally of the rod. The power for such rod in prior constructions usually is delivered angularly to the end of the rod through a universal joint, and in order to brace the rod against undue flexing, bearings have been interposed in the rod at spaced points. These bearings tend readily to clog with dirt and other foreign matter and require frequent cleaning and replacement. Obviously, the torque delivered to the rod at one end thereof results in destructive torque reaction forces which cannot be reduced or counteracted in any way.

An important object of the present invention is to provide a novel type of rod weeder wherein torque is delivered to the rod in a novel manner centrally of the length thereof, thus dividing the torsional strains to which the rod is subjected and improving the operation of the apparatus while at the same time lengthening its life and reducing the necessity for frequent replacement of parts.

A further object is to provide such an apparatus wherein the delivery of power to the rod centrally thereof is accomplished in a novel manner so as to effectively protect the power transmission means from damage or destruction incident to striking stones, becoming entangled with weeds, etc.

A further object is to provide a novel goose-neck arrangement for supporting the center of the rod and for delivering power thereto rearwardly thereof, the gooseneck extending over the rod rearwardly thereof, then downwardly, inwardly and forwardly of the rod, this arrangement of parts minimizing any entangling of weeds with the mechanism and effectively protecting the power transmission means.

A further object is to provide such an apparatus wherein the rod is formed of a pair of sections connected by novel means centrally of the width of the apparatus through novel power delivery means, and to provide the rod with spiral ribs which turn oppositely on each rod section so as to tend constantly to feed weeds laterally of the apparatus away from the driving connection to the rod sections.

A further object is to provide a novel type of combined socket and drive gear for the rod sections, such element having means for receiving driving heads on the rod sections to transmit rotational forces to the rod sections in an extremely simple manner without requiring any means for securing the rod heads in the sockets.

A further object is to provide novel goose-neck supported bearings for the rod sections outwardly of the driving connections to the rod sections, the supporting bearings being of such character as to permit flexing of the rod sections without damage and wherein the bearing means is protected in a highly efficient manner from the entrance of dirt and other foreign material.

Other objects and advantages of the present invention will become apparent during the course of the following description.

In the drawings, I have shown one embodiment of the invention. In this showing,

Figure 1 is a perspective view of the apparatus,

Figure 2 is a sectional view taken substantially on line 2—2 of Figure 1, parts being broken away and parts being shown in elevation, Figure 3 is an enlarged fragmentary sectional view on line 3—3 of Figure 2, Figure 4 is a similar view on line 4—4 of Figure 3, Figure 5 is a side elevation of the combined socket and driving gear, one of the rod sections being illustrated in section, Figure 6 is a sectional view on line 6—6 of Figure 1, Figure 7 is an enlarged detailed sectional view on line 7—7 of Figure 6, Figure 8 is a detailed perspective view of one of the bearing brackets and bearing retainers, the parts being shown separated, Figure 9 is an enlarged cross-sectional view through one of the weeder rods, showing the spiral ribs thereon, Figure 10 is a detailed sectional view on line 10—10 of Figure 2, Figure 11 is a similar view on line 11—11 of Figure 2, and Figure 12 is a fragmentary plan view of the rear supporting wheels.

Referring to Figure 1, the numeral 10 designates an axle housing to the ends of which are connected rearwardly extending frame members 11 further described below. The axle housing contains an axle (not shown) the ends of which carry wheels 12 preferably of the pneumatic tire type, as shown. The frame members 11 have downturned forward ends 13 to which are secured the rear ends of draft bars 14 provided at their forward ends with a draft connection 15 whereby the apparatus may be attached to a tractor to pull the apparatus over the ground.

Intermediate its ends, the axle housing 10 carries a gear housing 18 in which is arranged suitable power take-off gearing for operating the weeder rod sections. This gearing may be of any desired type and forms per se no part of the present invention, and a flexible shaft housing 19 leads to the gear housing 18 and contains a flexible heavy duty shaft 20 (Figure 4) further described below. A center frame section 21, generally similar to the frames 11, is welded or otherwise secured at its forward end to the gear housing 18 as shown in Figure 1.

Rearwardly of the axle housing 10, a transverse brace and support 24 extends across the apparatus. This brace may be in the form of a heavy wooden plank and is secured at its ends by suitable brackets 25 to the frame members 11. These brackets are preferably welded to the frame members 11.

The central frame member 21, as shown in Figure 10, has welded thereto a pair of bracket members 28 angular in form, as shown, and the tops of these bracket members are fixed to a brace plate 29, the curved shape of which will be apparent in Figures 1 and 2. The forward end of this plate is bolted or otherwise secured as at 30 to the support 24. Within the space between the bracket members 28 (Figure 10) is arranged a tube support formed of a pair of short heavy tubular members 31 and 32 welded to each other in perpendicular relationship. The member 32 extends transversely of the parallel sides of the bracket members 28 and is supported with respect thereto by a pin 33. A tube 34 is fixed in the tubular member 31 and houses the flexible shaft 20.

The forward end of the tube 34 carries a coupling 35 for connecting the tube to the flexible housing 19.

The center frame member 21 extends substantially straight rearwardly of the gear housing 18 and then is formed into a goose-neck portion 38 as clearly shown in Figures 1 and 2. The lower extremity of the goose-neck portion extends forwardly substantially horizontally as at 39 (Figures 2 and 4). The tube 34 extends rearwardly from the tubular member 31 and approximately from the point 40 (Figure 2). This tube follows the contour of the goose-neck 38 and is welded thereto to be rigidly supported thereby.

Adjacent the forward end of the lower extremity 39 of the goose-neck is arranged a housing 42 shaped as shown in Figures 1 and 4. This housing has a socket 43 rearwardly thereof to which the lower goose-neck end 39 is bolted or otherwise secured as at 44. Beneath the socket 43, the housing 42 is provided with a socket of circular cross-section indicated by the numeral 45 and slidably receiving the adjacent end of the tube 34. As stated above, from the point 40 on around the rear and bottom of the goose-neck 38, the tube 34 is welded to the goose-neck. The portion of the tube 34 in Figure 4 is, therefore, welded to the lower edge of the goose-neck portion 39 and accordingly cannot be withdrawn from the socket 45 except by removal of the bolts 44. Within the inner portion of the socket 45, the flexible shaft carries a generally conical worm 46 for a purpose to be described.

Within the housing 42 is arranged a combined gear and socket member 47. This member has its periphery formed as a worm wheel 48 meshing with the worm 46 to be driven thereby. At opposite sides of the gear 48, the member 47 is shouldered as at 49 to be arranged within bearings 50 mounted within the housing 42. These bearings may be of any desired type and are preferably sealed as at 51. Movement of one bearing is limited by a flange 52 while the other is retained in position by a removable plate 53. Thus the member 47 is rotatably supported and retained within the housing 42.

The member 47 is adapted to drive a pair of weeder rod sections each indicated as a whole by the numeral 56. Each rod section (Figure 9) is provided with a shaft portion 57 of circular cross-section having preferably integral spiral ribs 58 shown in the present instance as being three in number and having a flat leading face 59 and a curved following face 60. The ribs 58 at the adjacent ends of the two rod sections 56 are oppositely spiralled as shown in Figure 1 so that when the rod sections are rotated in the manner to be described, they will tend to feed weeds away from the housing 42. From a point spaced from its outer end, each rod section is oppositely spiralled for a purpose to be described. This housing as well as the rod sections are adapted to travel through the ground as shown in Figure 2. The ribs 58 cut their way through the ground while passage of the housing 42 through the ground is facilitated by providing the housing with a forwardly projecting blade 61.

The gear and socket member 47 is provided with an internal recess 65 having spaced arcuate wall portions 66 and intervening straight wall portions 67 and 68. The curved wall portions 66 are coaxial sections of a cylinder. The wall sections 67 are sections of a square, while the wall portions 68 are sections of a square turned forty-five degrees relative to the square defined by the faces 67. As shown in Figure 3, the recess 65 is arranged interiorly of the member 47 and is spaced from the side faces thereof. Opposite faces of the member 47 are provided with aligned square openings 70, the faces of which are coincident with the respective socket faces 68.

Each rod section 56 has its ribs 58 terminating outwardly of the faces of the member 47, beyond which points the shaft portion 57 of each weeder projects inwardly and is provided with a square head 71. These heads correspond in shape and size to the square openings 70 and the square of which the faces 67 are sections. Therefore, each head 71 is insertable through one of the openings 70 for movement into the socket 65, whereupon turning movement of the weeder rods 56 or the member 47 in the proper direction will seat the heads 71 against the faces 67. The intervening arcuate portions 66 of the recesses 65 permit turning movement of the heads after they have been inserted into the sockets 65.

The frame members 11 are provided with goose-necks 75 similar to the goose-neck 38 of the frame member 21. These goose-necks 75, therefore, extend downwardly and rearwardly, thence inwardly and forwardly to terminate in forwardly extending ends 76. These ends are secured as at 77 in sockets 78 (Figure 6) formed in bearing brackets 79. Each of these brackets corresponds generally in shape to the housing 42 and forms in itself a bearing housing having a forwardly extending blade 80 (Figures 6 and 8) to assist in cutting through the ground.

The bearing bracket or housing 79 is provided with an internal spherical recess 84 in which is arranged a bearing keeper 85 formed of a pair of semi-circular complementary sections as shown in Figure 8, and each is provided on opposite sides with flanges 86. The keeper 85 embraces an outer ball race 87 associated with an inner race 88 having bearing balls 89 therebetween. Sealing rings 90 are carried by the outer race and overlap the inner race, and resilient rings 91 have their radially outer edges tightly fitted between the outer race 87 and the flanges 86 with the inner edges of the rings 91 resiliently bearing against the inner ball race 88.

The rings 90 and 91 serve effectively to seal the bearing itself and the structure is assembled by moving the keeper sections 85 radially inwardly to the assembled positions shown in Figure 7. The housing 79 is provided with opposite radially cut grooves 94 (Figures 7 and 8) of a width at least equal to the width of the keeper 85 and having all portions spaced from the axis of the bearing a distance at least as great as the maximum radius of the spherical recess 84. The assembled bearing units and keeper 85 then may be arranged perpendicular to the face of the housing 79, for example in the approximate position of the keeper 85 in Figure 8, whereupon the keeper is moved through the grooves 94 until the spherical outer face of the keeper 85 has its axis coincident with the axis of the spherical surface 84. The bearing assembly is then rotated ninety degrees to the position shown in Figure 7.

Each weeder rod section projects through one of the bearings just described and thence beyond such bearing as shown in Figure 1. Each weeder rod section is provided with a cylindrical enlargement 98 of a diameter greater than the maximum diameter of the rod sections whereby such sections are insertable through the inner bearing race 88. Each rod section is oppositely spiralled at opposite sides of its enlargement 98 to feed dirt, etc., away from the bearing housings 79.

To assist in bracing the frame structure as a whole, any auxiliary bracing may be employed. In Figure 1, for example, braces 99 have been connected between the frame member 21 beneath the cross member 24, and the rear end portions of the frame members 11. Any other brace means may be employed, but such means forms no part of the present invention and need not be specifically illustrated.

A yoke-shaped bracket 100 is provided with rearwardly extending wall portions 101 (Figures 1, 2 and 11) preferably welded to the plate 29. A rack bar 102 projects upwardly through the yoke 100 and has its rear face in contact with a roller 103 carried by the yoke 100. The rack bar is provided with teeth 104 engaging a pinion 105 rotatably supported by the side walls 101. The shaft 106 of the pinion carries a worm wheel 107 meshing with a worm 108 mounted on a shaft 109. This shaft is journaled in a bearing 110 which may be formed integral with the yoke 100, and in a bearing 111 welded to the plate 29. The rear end of the shaft 109 terminates in a crank 112.

The lower end of the rack bar 102 carries a rearwardly extending yoke member 115 to which is attached a tube 116 serving as a bearing for an axle 117 supporting tail wheels 118. The wheels 118 as shown in Figure 12 may be metal and each is preferably provided with an annular flange 119. These wheels are inclined away from each other forwardly, to crowd soil inwardly to cover the small trench left by the center rod bearing.

Operation

The draft connection 15 is connected by a suitable hitch to a tractor employed for pulling the apparatus over the ground. Rotation of the wheels 12 in contact with the ground drives the flexible shaft 20 through the gearing (not shown) in the housing 18. Since the particular power take-off gearing is of no importance and the flexible shaft may be driven in any desired manner, it is unnecessary that the gearing be illustrated.

The flexible shaft housing 19 extends only to the coupling 35. The remainder of the flexible shaft is housed in the solid relatively rigid tube 34, the forward end of which is supported relative to the plate 29 by the elements 31, 32 and 33 and the bracket members 28. From the point 40 (Figure 2) around the goose-neck 38, the tube 34 is preferably welded and rigidly held in position by the goose-neck 38.

The lower rear end of the tube 34 is free from its extremity to the right hand end of the socket 43. Accordingly, this tube end and its associated conical worm 46 is insertable into the socket 45 as the housing 42 is moved rearwardly for the connection of the socket 43 to the goose-neck end 39. Accordingly, the tube 34 is effectively held in position to properly house the flexible shaft 20 and drive the pinion 46, and this element imparts rotation to the gear and socket member 47 through the teeth 48 thereof.

Both rod heads 71 will be arranged in the socket 65 and the socket faces 67, four in number, engage the sides of the heads 71 to apply torque to the rods 56 to rotate them. This direction of rotation will be clockwise as viewed in Figures 1 and 4, these views looking from the left hand side of the machine.

The apparatus in actual use is constructed for the traveling of the weeder rods at a depth up to six inches below the surface of the ground. As the apparatus moves forwardly, the blades 61 (Figure 4) and 80 (Figure 6) assist in breaking the ground ahead of the bearing housings 42 and 79, while the rotating rod sections break their own ground ahead of them due to the action of the ribs 58. The weeder rods act to uproot weeds and bring the roots above the surface of the ground so that they will decay or dry up and die. While spirally ribbed rod sections have been illustrated and their use is preferred, it will be apparent to those skilled in the art that under some conditions other types of rods may be employed, with or without ribs.

The ribs 58 are spiralled oppositely from the center bearing housing 42 and from the end bearing housing 79 and accordingly they tend to feed the roots of the weeds laterally away from the housings 42 and 79, thus keeping the rod bearings clear of dirt and other foreign matter. As stated, torque is delivered to the rods through the faces 67 in engagement with the sides of the heads 71. These heads are readily inserted in position by moving them inwardly through the openings 70 in registration therewith. In the use of the apparatus, the torque reaction on the rods keeps the heads 71 in engagement with the driving faces 67. Accordingly, there is no tendency for these heads to turn reversely to come into registration with the openings 70, and it is unnecessary to provide any securing means to hold the heads 71 in the socket 65.

By driving the weeder rod from the center of the length thereof, a rod of a given length has its destructive torque reaction forces divided by two as distinguished from the usual driving of a unitary weeder rod from one end thereof. Moreover, in conventional constructions, the drive is usually through at least two universal joints and the transmission of power at the usual angles results in power losses which are prevented with the present apparatus. The housings 42 and 79 are quite compact and require minimum force for breaking their way through the ground. The arrangement of the conical worm 46 (Figure 4) minimizes the vertical distance between the axis of the rod sections 56 and the lower extremity of the housing 42, thus minimizing the power necessary to force this housing through the ground.

The supporting of the rod sections by the gooseneck arrangement as shown results in transmitting a pushing force to the rod sections from points rearwardly thereof, and accordingly the rods are free from any supporting connections except directly rearwardly thereof. This permits the weeds to be uprooted with substantially no tendency for a clogging action to occur as is true when the rods are supported by other means.

The rods are adapted to flex to a reasonable extent under varying loads. This flexing is permitted relative to the housings 79 by the spherical mounting of the bearings therein. Flexing of the rod sections, therefore, does not strain either the bearings or the rod sections. Each of the heads 71 has sufficient clearance relative to the walls of the socket 65 to permit such flexing of the rod sections to take place without damage to the parts.

The pulling forces transmitted to the rod are directly parallel to the line of motion of the apparatus and the frame members 11 and 21 adequately serve to transmit such forces. It is unnecessary heavily to brace the frame tructure of the apparatus, and accordingly a saving of several hundred pounds in weight is effected, as compared with conventional machines of this type, and a maximum degree of clearance for trash and weeds is accomplished.

As stated, the apparatus may be vertically adjusted for movement of the rod sections through the ground at a depth up to six inches below the surface. By the same means, the rods may be lifted wholly clear of the ground for transportation of the apparatus from place to place. This is readily accomplished merely by turning the crank 12. This operation rotates the screw 108 (Figure 11) to rotate the worm gear 107 and thus rotate the pinion 105 to relatively raise and lower the rack bar 102. Inasmuch as the transmission of such motion is irreversible because of the use of the worm 108, the tail wheels 118 will remain in any vertically adjusted positions without the use of means for locking the rack bar 102 with the wheels 118 in adjusted positions. Motion may be transmitted to the rack bar 102 to raise or lower the rod sections by turning the crank 112 in the proper direction, as will be apparent.

I claim:

1. A rod weeder comprising a pair of weeder rod sections arranged in aligned end to end relation, a pair of bearing means respectively supporting said rod sections at points spaced from the adjacent ends thereof, a pair of spaced parallel frame members extending over said rod sections from a point forwardly thereof, then downwardly and rearwardly of said rod sections and then forwardly and connected to the respective bearing means, a main frame member intermediate said first-named frame members substantialy in the vertical plane of said adjacent ends of said rod sections, said main frame member corresponding in shape to said first-named frame members, bearing means carried by the end of said main frame member, means rotatable in said last-named bearing means and having driving connection with said adjacent ends of said rod sections to rotate them, a flexible shaft, a housing in which said shaft is rotatable, said main frame member having an edge remote from said rod sections and said housing following the contour of and being fixed to said main frame member along said edge thereof, and means for transmiting power from said flexible shaft to said rotatable means.

2. A rod weeder comprising a pair of weeder rod sections arranged in aligned end to end relation, a pair of bearing means respectively supporting said rod sections at points spaced from the adjacent ends thereof, a pair of spaced parallel frame members extending over said rod sections from a point forwardly thereof, then downwardly and rearwardly of said rod sections and then forwardly and connected to the respective bearing means, a main frame member intermediate said first-named frame members substantailly in the vertical plane of said adjacent ends of said rod sections, said main frame member corresponding in shape to said first-named frame members, bearing means carried by the end of said main frame member, means rotatable in said last-named bearing means and having driving connection with said adjacent ends of said rod sections to rotate them, a flexible shaft, a housing in which said shaft is rotatable, said main frame member having an edge remote from said rod sections and said housing following the contour of and being fixed to said main frame member along said edge thereof, said rotatable means having worm gears formed therearound, and a conical worm fixed to the end of said flexible shaft and extending forwardly substantially horizontally therefrom and meshing with said worm gear.

3. A rod weeder comprising a main frame member and a pair of auxiliary frame members spaced therefrom respectively on opposite sides thereof, said frame members generaly corresponding in shape and each having a substantially horizontal portion spaced above the ground and a rear goose-neck portion curving downwardly and rearwardly and then downwardly and forwardly and terminating in ends substantially in alignment transversely of said frame members, bearings carried by each of said ends of said frame members, a pair of weeder rod sections arranged in end to end relation and having adjacent ends terminating within the bearing of said main frame member, said rod sections being rotatable in the respective bearings of said auxiliary frame members, and a rotatable member mounted in the bearing of said main frame member and having driving engagement with said adjacent ends of said rod sections, said rod sections projecting laterally beyond the bearings of said auxiliary frame members, and such bearings comprising housings carried by the respective ends of said auxiliary frame members and bearing means in the respective housings surrounding the respective rod sections and each comprising a retainer provided with a spherical outer face, the inner face of each housing being spherical for the rocking of its retainer therein coincident to flexing of said rod sections.

4. Apparatus constructed in accordance with claim 3 wherein said adjacent ends of said rod sections are provided with polygonal heads, said rotatable member having a socket therein provided with faces corresponding to the relative arrangement of the sides of said polygonal heads and engaging therewith to establish driving connection between said rotatable member and said polygonal heads, there being play between said heads and said socket to accommodate flexing of said rod sections between said bearings.

5. A rod weeder comprising an intermediate frame member and auxiliary frame members spaced therefrom on opposite sides thereof, said frame members generally corresponding in shape and each having a rearwardly extending upper portion spaced above the ground and a rear goose-neck portion curving downwardly and rearwardly and then downwardly and forwardly and terminating in ends substantially in alinement transversely of said frame members, bearings carried by the ends of said frame members, a pair of weeder rod sections arranged in end-to-end relation and having adjacent ends terminating within the bearing of said intermediate frame member, said rod sections being rotatable in the bearings of said auxiliary frame members, and a rotatable member mounted in the bearing of said intermediate frame member, the adjacent ends of said rod sections having enlarged polygonal heads, said rotatable member having an internal socket spaced from the sides thereof and provided with faces engaging the sides of said enlarged heads, said rotatable member having an opening in each side thereof for the insertion of said heads, said openings corresponding in shape to said heads but being circumferentially offset from said socket whereby said heads are insertable through said openings and then turnable into driving engagement with said faces of said socket.

6. A rod weeder comprising an intermediate frame member and auxiliary frame members spaced therefrom on opposite sides thereof, said frame members generally corresponding in shape and each having an upper portion spaced above the ground and a rear goose-neck portion curving downwardly and rearwardly and then downwardly and forwardly and terminating in ends substantially in alinement transversely of said frame members, bearings carried by said ends of said frame members, a pair of weeder rod sections arranged in end-to-end relation and having adjacent ends terminating within the bearing of said intermediate frame member, said rod sections being rotatable in the respective bearings of said auxiliary frame members, a rotatable member mounted in the bearing of said intermediate frame member and having driving engagement with said adjacent ends of said rod sections, said rotatable member having an external worm gear formed thereon, a worm projecting into the bearing of said intermediate frame member from the rear thereof and engaging said worm gear, a flexible shaft connected to said worm, the goose-neck portion of said intermediate frame member having an edge remote from said weeder rod sections, and a housing for said flexible shaft following the contour of at least a portion of the length of said remote edge and fixed thereto.

7. A rod weeder comprising a pair of weeder rod sections arranged in end-to-end relation, a single bearing means supporting each rod section at a point spaced from the adjacent ends of said rod sections, and driving means connected to said adjacent ends of said rod sections, each of said single bearing means being supported for universal movement and each rod section projecting beyond its associated single bearing means, whereby each rod section, inwardly and outwardly of its associated single bearing means is adapted to flex by virtue of the universal mounting of each of said single bearing means, said driving means comprising a rotatable member, the adjacent ends of said rod sections having enlarged polygonal heads and said rotatable member having an internal socket spaced from the sides thereof and provided with faces engaging the sides of said enlarged heads, said rotatable member having an opening in each side thereof corresponding in shape to said heads but circumferentially offset from said socket whereby said heads are insertable through said openings and then turnable into driving engagement with said faces of said sockets.

References Cited in the file of this patent

UNITED STATES PATENTS

| 486,534 | Lundy | Nov. 22, 1892 |
| 1,338,204 | Wolfe | Apr. 27, 1920 |
| 1,384,631 | Parschauer | July 12, 1921 |
| 1,557,569 | Eames et al. | Oct. 20, 1925 |
| 1,637,098 | Barnes | July 26, 1927 |
| 1,762,572 | Davidson | June 10, 1930 |
| 2,093,070 | Bloom et al. | Sept. 14, 1937 |
| 2,176,541 | Morris | Oct. 17, 1939 |
| 2,227,527 | Wolfe | Jan. 7, 1941 |
| 2,318,097 | Richmond | May 4, 1943 |
| 2,543,905 | Firth | Mar. 6, 1951 |
| 2,601,653 | Wolfe | June 24, 1952 |
| 2,603,137 | Fundingsland | July 15, 1952 |
| 2,614,475 | Mowbray | Oct. 21, 1952 |

FOREIGN PATENTS

| 194,113 | Switzerland | Feb. 1, 1938 |